US009767133B2

(12) United States Patent
Adam et al.

(10) Patent No.: US 9,767,133 B2
(45) Date of Patent: Sep. 19, 2017

(54) SYSTEMS AND METHODS FOR ALTERNATIVE CHANGE PROCESSES FOR CHANGES TO DATA OBJECTS

(71) Applicant: salesforce.com, inc., San Francisco, CA (US)

(72) Inventors: Abraham Adam, San Francisco, CA (US); Alex Gitelman, Berkeley, CA (US); Daphne A. Kao, San Francisco, CA (US); Simon Wong, San Carlos, CA (US); Harish Bellamane, Bangalore (IN); Michael Tang, Petaluma, CA (US); Stefan Eberl, San Francisco, CA (US); Twisha Mehta, Fremont, CA (US); Venkatachalam Muthukrishnan, Tamilnadu (IN)

(73) Assignee: salesforce.com, inc., San Francisco, CA (US)

( * ) Notice: Subject to any disclaimer, the term of this patent is extended or adjusted under 35 U.S.C. 154(b) by 348 days.

(21) Appl. No.: 14/066,300

(22) Filed: Oct. 29, 2013

(65) Prior Publication Data
US 2014/0172889 A1      Jun. 19, 2014

Related U.S. Application Data

(60) Provisional application No. 61/738,469, filed on Dec. 18, 2012, provisional application No. 61/738,474, filed on Dec. 18, 2012, provisional application No. 61/738,476, filed on Dec. 18, 2012.

(51) Int. Cl.
*G06F 17/30*      (2006.01)

(52) U.S. Cl.
CPC .. *G06F 17/30345* (2013.01); *G06F 17/30309* (2013.01); *G06F 17/30477* (2013.01); *G06F 17/30548* (2013.01)

(58) Field of Classification Search
CPC ......... G06F 17/30345; G06F 17/30309; G06F 17/30548; G06F 17/30477
USPC ....................................................... 707/756
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

U.S. Appl. No. 13/986,251, filed Apr. 16, 2013.

*Primary Examiner* — Joshua Bullock
(74) *Attorney, Agent, or Firm* — Dergosits & Noah LLP; Todd A. Noah (57) ABSTRACT

Systems and methods are provided for alternative change processes for changes to data objects. A change to a data object is recorded, wherein the change is submitted to a first change process. The first change process is disabled. A second change process is asynchronously executed to process the change to the data object.

20 Claims, 4 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1* | 11/2003 | Chen .................. H04L 29/06 715/733 |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1* | 7/2009 | Marlow .................. G06Q 10/10 709/204 |
| 2009/0313503 A1* | 12/2009 | Atluri .................. G06F 11/1453 714/19 |
| 2012/0041928 A1* | 2/2012 | Kamra ............. G06F 17/30575 707/656 |
| 2012/0233137 A1* | 9/2012 | Jakobson ............ G06F 3/04847 707/695 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

| Identifier | Field Name | Value | Timestamp |
|---|---|---|---|
| Acme Opportunity | Amount | $1,000 | January 7 |
| Acme Opportunity | Schedule | February | January 7 |
| Acme Opportunity | Amount | $2,000 | January 14 |
| Acme Opportunity | Schedule | March | January 21 |
| Acme Opportunity | Amount | $3,000 | January 28 |
| Acme Opportunity | Schedule | April | January 28 |

202

| Identifier | Field 1 Name | Value 1 from | Value 1 to | Field 2 Name | Value 2 from | Value 2 to | Valid from | Valid to |
|---|---|---|---|---|---|---|---|---|
| Acme Opportunity | Amount | - | $1,000 | Schedule | - | February | January 7 | January 14 |
| Acme Opportunity | Amount | $1,000 | $2,000 | Schedule | February | February | January 14 | January 21 |
| Acme Opportunity | Amount | $2,000 | $2,000 | Schedule | February | March | January 21 | January 28 |
| Acme Opportunity | Amount | $2,000 | $3,000 | Schedule | March | April | January 28 | Current |

SYSTEMS AND METHODS FOR ALTERNATIVE CHANGE PROCESSES FOR CHANGES TO DATA OBJECTS

CLAIM OF PRIORITY

This application claims the benefit of U.S. Provisional Patent Application No. 61/738,469 entitled RECORDING DATA HISTORY IN THE PRESENCE OF ALTERNATIVE FLOW, by Abraham, et al., filed Dec. 18, 2012, U.S. Provisional Patent Application No. 61/738,474 entitled USING CUSTOM OBJECTS TO RECORD OBJECT HISTORY, by Abraham, et al., filed Dec. 18, 2012, and U.S. Provisional Patent Application No. 61/738,476 entitled MATERIALIZING HISTORICAL DATA FROM CURRENT DATA, by Abraham, et al., filed Dec. 18, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

ALTERNATIVE CHANGE PROCESSES FOR CHANGES TO DATA OBJECTS

One or more implementations relate generally to alternative change processes for changes to data objects.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In computer science, an object is a location in memory having a value and referenced by an identifier. Since the introduction of object-oriented programming, an object can refer to a particular instance of a class, and can include multiple fields that have their corresponding values. Relational database management systems may track historical changes to data objects to provide additional information to system users.

For example, a salesperson who stores sales opportunity information using a database management system may benefit from accessing the history of the sales opportunity information for a prospective customer, such as changes to the sales opportunity amounts and the sales opportunity scheduled sales dates during the last month. The salesperson contacted a sales lead on January 7th, established a potential sale amount of $1,000 scheduled for the beginning of February, and stored this information using the database management system. On January $14^{th}$, the sales lead emailed the salesperson to increase the potential sales amount to $2,000, and the salesperson stored this information. On January $21^{st}$, the sales lead called the salesperson to postpone the scheduled sales date to the beginning of March, and the salesperson stored this information. On January $28^{th}$, the salesperson called the sales lead, negotiated a revised potential sales amount of $3,000 scheduled for the beginning of April, and stored this information. On January $30^{th}$, the salesperson accesses the database management system to determine what were the potential sales amount and the scheduled sales date for this sales opportunity on January $25^{th}$ when the salesperson had lunch with a friend of the sales lead. The database management system may store the history of changes to data objects by using a name-value pair, such that the database management system may respond to the salesperson's query by retrieving six different name-value pairs stored in data objects before being able to respond that on January $25^{th}$ the potential sales amount was $2,000 and the scheduled sales date was the beginning of March for this sales opportunity.

BRIEF SUMMARY

In accordance with embodiments, there are provided systems and methods for alternative change processes for changes to data objects. A change to a data object is recorded, wherein the change is submitted to a first change process. For example, a system identifies a change in ownership of an opportunity object that is scheduled for implementation by a structured query language process, in contrast to user edits of the opportunity object, which the system would handle by the standard java process. The first change process is disabled. For example, the system sets a trigger to disable the alternative change process, which is written in customized code that is less efficient than the standard code for handling most changes to data objects. A second change process is asynchronously executed to process the change to the data object. For example, the system executes standard code to handle the change to the data object on an asynchronous basis.

Continuing this example, the system may execute standard code to store a history object that is identified as the Acme Corporation sales opportunity, includes the name "amount," and includes the value of $1,000 that began on January $7^{th}$ and ended on January $14^{th}$. Further to this example, the system may output a history object that is identified as the Acme Corporation sales opportunity and specifies the value $2,000 in response to a query that specifies the Acme Corporation sales opportunity, the name "amount," and the date of January $25^{th}$, wherein the system needs to retrieves only one history object to respond to this query. In contrast, prior art data management systems may retrieve six different name-value pairs stored in six different data objects before being able to respond to the same query. Accordingly, systems and methods are provided for alternative change processes for changes to data objects.

While one or more implementations and techniques are described with reference to an embodiment in which batch processing of data records in an on-demand system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for alternative change processes for changes to data objects.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for alternative change processes for changes to data objects will be described with reference to example embodiments.

The following detailed description will first describe a method for alternative change processes for changes to data objects.

Next, an example name-value pair table and an example history object table for alternative change processes for changes to data objects are described.

Figure 1:
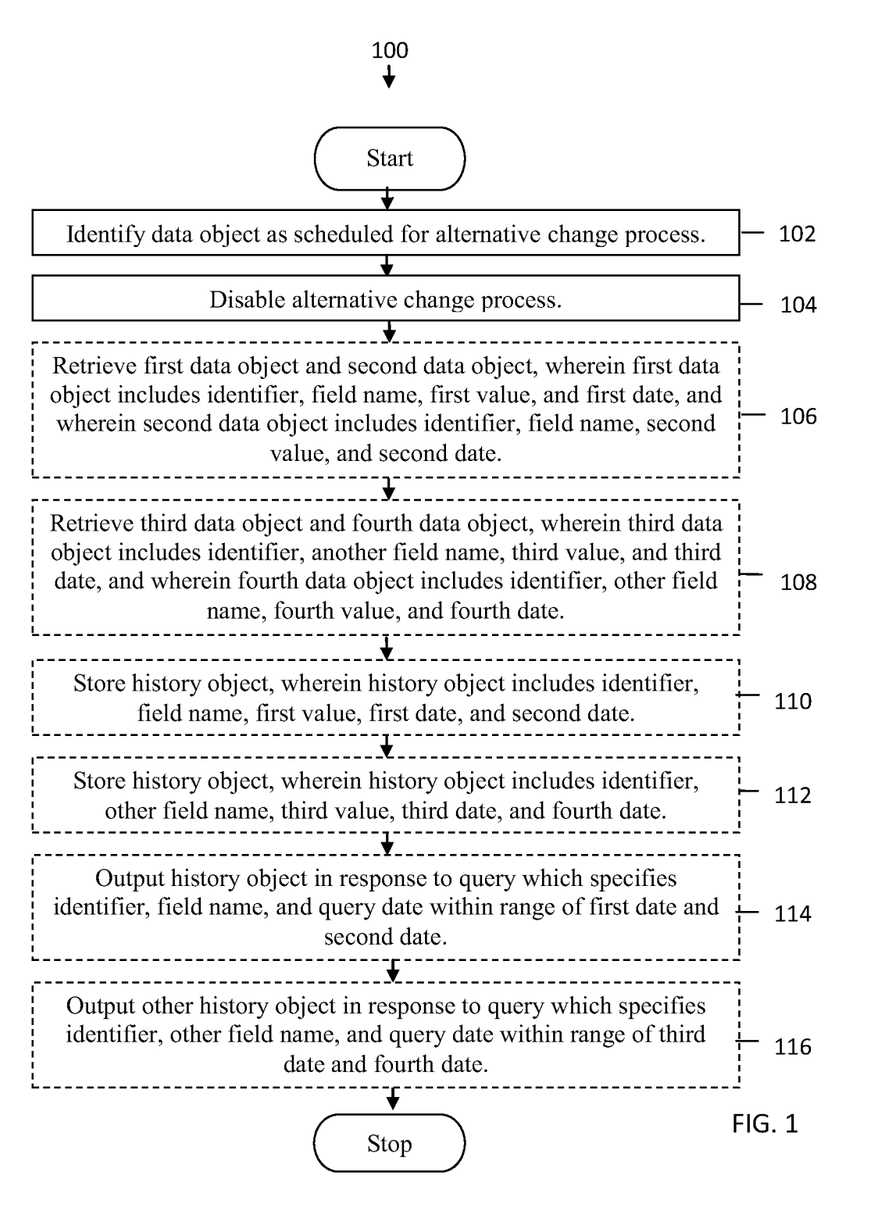
FIG. 1 is an operational flow diagram illustrating a high level overview of a method for alternative change processes for changes to data objects, in an embodiment.

FIG. 1 is an operational flow diagram illustrating a high level overview of a method 100 for alternative change processes for changes to data objects. As shown in FIG. 1, a system can enable alternative change processes for changes to data objects.

In block 102, a data object is identified as scheduled for an alternative change process. For example and without limitation, this can include a database system identifying a change in ownership of an opportunity object that is scheduled for implementation by a structured query language process, in contrast to user edits of the opportunity object, which the database management system would handle by the standard java process. Some database management systems process a few unusual types of changes to data objects through alternative change processes, which are written in customized code that is less efficient than the standard code that processes most changes to data objects. When the database system identifies a change to data objects that is scheduled for an alternative change process, the database system saves the corresponding data objects to a staging table and sets a trigger to request the standard code to process the change instead.

In block 104, an alternative change process is disabled, wherein storing a history object optionally includes asynchronously storing the history object. By way of example and without limitation, this can include the database system setting a trigger to disable the alternative change process, which is written in customized code that is less efficient than the standard code for handling most changes to data objects. Therefore, the standard code for handling most changes to data objects can subsequently process the data object on an asynchronous basis, which only slightly delays the availability of the history of the corresponding change. Rerouting changes to data objects which would have been processed by a customized alternative change process to be handled by the standard change process insures that all changes to data objects are processed by the same code that creates historical objects for data object changes.

In block 106, a first data object and a second data object are optionally retrieved, wherein the first data object includes an identifier, a field name, a first value, and a first date, and wherein the second data object includes the identifier, the field name, a second value, and a second date. In embodiments, this can include the database system retrieving data objects that are identified as the Acme Corporation sales opportunity, include the name "amount," include the value of $1,000 corresponding to the timestamp for January $7^{th}$, include the value of $2,000 corresponding to the timestamp for January $14^{th}$, and include the value of $3,000 corresponding to the timestamp for January $28^{th}$.

In block 108, a third data object and a fourth data object are optionally retrieved, wherein the third data object includes an identifier, another field name, a third value, and a third date, and wherein the fourth data object includes the identifier, the other field name, a fourth value, and a fourth date. For example and without limitation, this can include the database system retrieving data objects that are identified as the Acme Corporation sales opportunity, include the value of February corresponding to the timestamp for January $7^{th}$, include the value of March corresponding to the timestamp for January $21^{st}$, and include the value of April corresponding to the timestamp for January $28^{th}$. The database system may retrieve multiple data objects in chunks, such as a chunk of 250 data objects out of all of the data objects that correspond to the date of January $7^{th}$. If the database system detects an error in retrieving blocks of data objects, the database system may retrieve data objects one by one, and/or re-retrieve only the data objects that resulted in a retrieval error. When a chunk of data objects are being retrieved, the database system locks the source records to prevent concurrent modifications. The database system validates information in the data objects before storing the information as history objects. For example, the database system insures that the timestamp for the first value of amount precedes the timestamp for the second value of amount.

In block 110, a history object is optionally stored, wherein the history object includes a identifier, a field name, a first value, a first date, a second date, and possible a preceding value corresponding to the first value. By way of example and without limitation, this can include the database system storing a first history object that is identified as the Acme Corporation sales opportunity, includes the name "amount," and includes the value of $1,000 that begins on January $7^{th}$ and ends at a time on January $14^{th}$. The database system may also store a second history object that is identified as the Acme Corporation sales opportunity, includes the name "amount," includes the value of $2,000 that begins at a time on January $14^{th}$ and ends at a time on January $21^{st}$, and includes the preceding value of $1,000. The database system may also store a third history object that is identified as the Acme Corporation sales opportunity, includes the name "amount," includes the value of $2,000 that begins at a time on January $21^{st}$ and ends at a time on January $28^{th}$, and includes the preceding value of $2,000. The database system may also store a fourth history object that is identified as the Acme Corporation sales opportunity, includes the name "amount," includes the value of $3,000 that begins at a time on January $28^{th}$ and continues to the current date, and includes the preceding value of $2,000. The database system store all of the fields in the same history object whether or not all of the fields changed, as long as at least one field changed.

In block 112, a history object is optionally stored, wherein the history object includes the identifier, another field name, a third value, a third date, a fourth date, and possibly another preceding value corresponding to the third value. In embodiments, this can include the database system storing into the first history object that is identified as the Acme Corporation sales opportunity, the name "schedule," and the value of February that begins on January $7^{th}$ and ends at a time on January $14^{th}$. The database system may also store into the second history object that is identified as the Acme Corporation sales opportunity, the name "schedule," and the value of February that begins at a time on January $14^{th}$ and ends at a time on January $21^{st}$, and the preceding value of February. The database system may also store into the third history object that is identified as the Acme Corporation sales opportunity, the name "schedule," and the value of March that begins at a time on January $21^{st}$ and ends at a time on January $28^{th}$, and the preceding value of February. The database system may also store into the fourth history object that is identified as the Acme Corporation sales opportunity, the name "schedule," and the value of April that begins at a time on January $28^{th}$ and continues to the current date, and the preceding value of March. The database system may store multiple history objects in chunks, such as a chuck of 250 history objects out of all of the history objects that correspond to the date of January $7^{th}$. If the database system detects an error in storing blocks of history objects, the database system may store history objects one by one, and/or re-store only the data change records that resulted in a store error. When a chunk of history objects are being stored, the database system locks the target records to prevent concurrent modifications.

In block 114, a history object is optionally output in response to a query which specifies an identifier, a field name, and a query date within a range of a first date and a second date. For example and without limitation, this can include the database system outputting the third history object that is identified as the Acme Corporation sales opportunity and specifies the value $2,000 in response to a query that specifies the Acme Corporation sales opportunity, the name "amount," and the date of January $25^{th}$. The third history object also includes other information for the Acme Corporation sales opportunity on January $25^{th}$, such as the value of March for the name "schedule." The database system needs to retrieves only one history object to respond to this query. In contrast, prior art data management systems may retrieve six different name-value pairs stored in six different data objects before being able to respond to the same query.

In block 116, a history object is optionally output in response to a query which specifies an identifier, another field name, and a query date within a range of a third date and a fourth date. By way of example and without limitation, this can include the database system outputting the third history object that is identified as the Acme Corporation sales opportunity and specifies the value March in response to a query that specifies the Acme Corporation sales opportunity, the name "schedule," and the date of January $25^{th}$. The third history object also includes other information for the Acme Corporation sales opportunity on January $25^{th}$, such as the value of $2,000 for the name "amount." The database system needs to retrieves only one history object to respond to this query. In contrast, prior art data management systems may retrieve six different name-value pairs stored in data objects before being able to respond to the same query.

Accordingly, systems and methods are provided for alternative change processes for changes to data objects. The method 100 may be repeated as desired. Although this disclosure describes the blocks 102-116 executing in a particular order, the blocks 102-116 may be executed in a different order.

Figure 2:
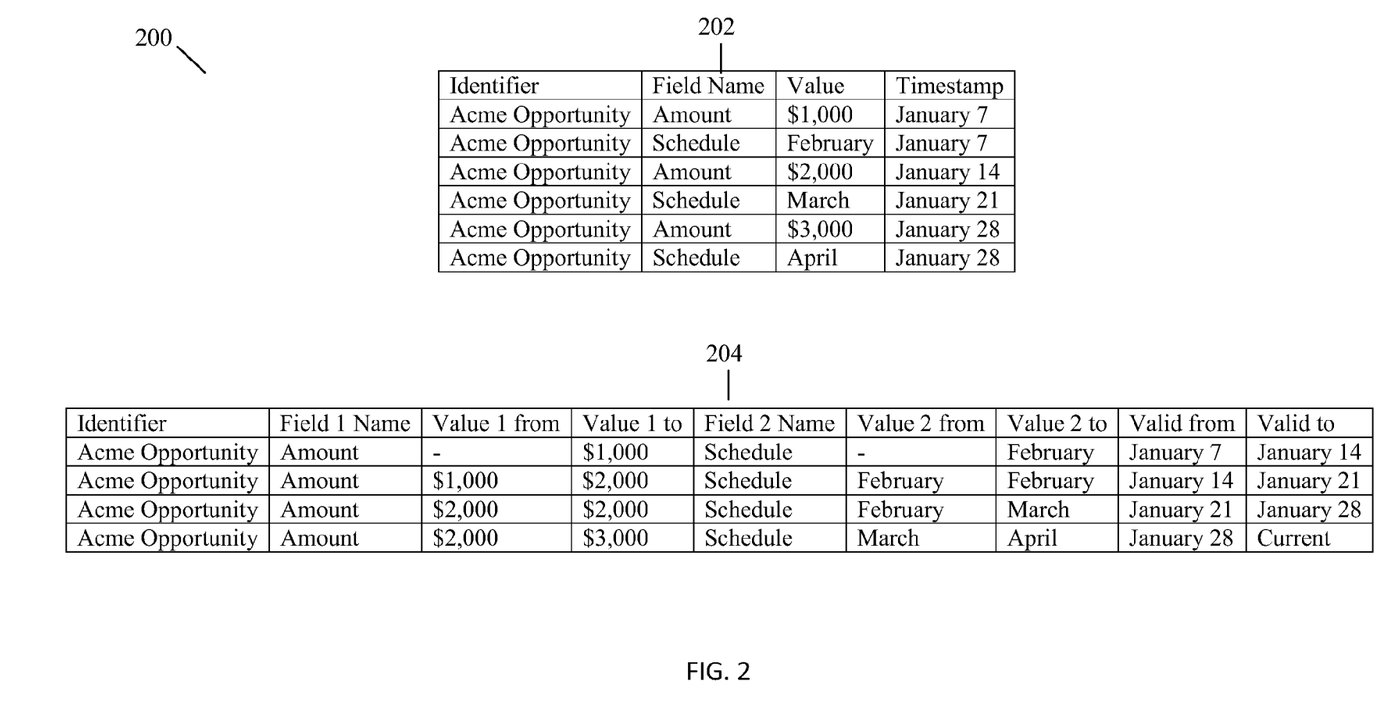
FIG. 2 illustrates a block diagram of an example name— value pair table and an example history object table for alternative change processes for changes to data objects.

FIG. 2 illustrates a block diagram of an example name-value pair table and an example history object table for alternative change processes for changes to data objects. The block diagram 200 includes a name-value pair table 202 and a history object table 204.

A prior art database management system may create the name-value pair table 202 based on processing a name-value pair for each change to a data object. For example, when a user creates the Acme Corporation opportunity data object on January $7^{th}$ and assigns the value of $1,000 to the amount field and assigns the value of February to the schedule field, the prior art system creates the first two corresponding rows in the name-value pair table 202. When the user changes the value for the amount field from $1,000 to $2,000 on January $14^{th}$, the prior art system creates the third corresponding row in the name-value pair table 202. When the user changes the value for the schedule field from February to March on January $21^{st}$, the prior art system creates the fourth corresponding row in the name-value pair table 202. When the user changes the value for the amount field from $2,000 to $3,000 and changes the value for the schedule field from March to April on January $28^{th}$, the prior art system creates the fifth and sixth corresponding row in the name-value pair table 202.

Although the prior art system uses a simple process to create the name-value pair table 202, the process of querying the name-value pair table 202 may be very complex. For example, on January $30^{th}$, the salesperson accesses the prior art system to determine what were the potential sales amount and the scheduled sales date for the Acme Corporation opportunity on January $25^{th}$ when the salesperson had lunch with a friend of the sales lead. First, the prior art system retrieves the first row because the first row stores the value $1,000 for the amount on January $7^{th}$, and the prior art system cannot yet determine whether or not the value of $1,000 will still be current on the queried date of January $25^{th}$. Then the prior art system retrieves the second row because the second row stores the value February for the schedule on January 7$^{th}$, and the prior art system cannot yet determine whether or not the value of February will still be current on the queried date of January 25$^{th}$. Next, the prior art system retrieves the third row because the third row stores the value $2,000 for the amount on January 14$^{th}$, and discards the value $1,000 for the amount on January 7$^{th}$, but the prior art system cannot yet determine whether or not the value of $2,000 will still be current on the queried date of January 25$^{th}$. Then the prior art system retrieves the fourth row because the fourth row stores the value March for the schedule on January 21$^{st}$, and discards the value February for the schedule on January 7$^{th}$, but the prior art system cannot yet determine whether or not the value of March will still be current on the queried date of January 25$^{th}$. Then the prior art system retrieves the fifth row because the fifth row stores the value $3,000 for the amount on January 28$^{th}$, which finally enables the prior art system to determine that the previous value of $2,000 was the current value for amount on the queried date of January 25$^{th}$. Finally, the prior art system retrieves the sixth row because the sixth row stores the value April for the schedule on January 28$^{th}$, which enables the prior art system to determine that the preceding value of March was the current value for schedule on the queried date of January 25$^{th}$. The prior art system had to retrieve and temporarily store six different name-value pair stored in six different data objects to respond to a simple query because of the inefficient process that is required to query the name-value table 202. Although this simple example describes a very complex querying and retrieval process required for only two fields, the process for querying and retrieving data objects for larger numbers of fields, such as are required by actual users of database management systems, is even more complex, and therefore prone to error.

In contrast, the history object table 204 enables an efficient querying process. Although the history object table 204 in FIG. 2 depicts the historical database columns as named after the source columns in the name-value table 202, this is only an example, as the historical database columns may be named using other naming conventions. When a user creates the Acme Corporation opportunity data object on January 7$^{th}$ and assigns the value of $1,000 to the amount field and assigns the value of February to the schedule field, the database system creates the first corresponding row in the history object table 204. The first row includes null indicators for the "value from" columns to indicate that preceding values do not exist for the amount field or for the schedule field, which informs a user that the first row corresponds to the creation of the fields amount and schedule. The first row also includes January 7$^{th}$ for a "valid from" column, which indicates the creation date for the corresponding fields, and initially includes "current" for the "valid to" column, which indicates that on and after January 7$^{th}$ that the information in the first row was the current information for the corresponding Acme Corporation opportunity object.

When the user changes the value for the amount field from $1,000 to $2,000 on January 14$^{th}$, the database system creates the second corresponding row in the history object table 204. The second row includes $1,000 and February for the "value from" columns to indicate the preceding values for the amount field and for the schedule field, and $1,000 and February for the "value to" columns to indicate the current values for the amount field and the schedule field. The second row also includes January 14$^{th}$ for a "valid from" column, which indicates the date change for the corresponding fields, and initially includes "current" for the "valid to" column, which indicates on and after January 14$^{th}$ that the information in the second row is the current information for the corresponding Acme Corporation opportunity object. The database system also copies the date change of January 14$^{th}$ over "current" in the "valid to" column in the first row to indicate that the information in the first row is no longer current. Although the simplified example of the history object table 204 does not include times with the depicted dates, the database system stores change times with the "valid to" date in the first row and the "valid from" date in the second row so that no overlap in time exists for information corresponding to January 14$^{th}$.

When the user changes the value for the schedule field from February to March on January 21$^{st}$, the database system creates the third corresponding row in the history object table 204. The third row includes $2,000 and February for the "value from" columns to indicate the preceding values for the amount field and for the schedule field, and $2,000 and March for the "value to" columns to indicate the current values for the amount field and the schedule field. The third row also includes January 21$^{st}$ for a "valid from" column, which indicates the date change for the corresponding fields, and initially includes "current" for the "valid to" column, which indicates that on January 21$^{st}$ that the information in the third row was the current information for the corresponding Acme Corporation opportunity object. The database system also copies the date change of January 21$^{st}$ over "current" in the "valid to" column in the second row to indicate that the information in the second row is no longer current. Although the simplified example of the history object table 204 does not include times with the depicted dates, the database system stores change times with the "valid to" date in the second row and the "valid from" date in the third row so that no overlap in time exists for information corresponding to January 21$^{st}$.

When the user changes the value for the amount field from $2,000 to $3,000 and changes the value for the schedule field from March to April on January 28$^{th}$, the database system creates the fourth corresponding row in history object table 204. The fourth row includes $2,000 and March for the "value from" columns to indicate the preceding values for the amount field and for the schedule field, and $3,000 and April for the "value to" columns to indicate the current values for the amount field and the schedule field. The fourth row also includes January 28$^{th}$ for a "valid from" column, which indicates the date change for the corresponding fields, and includes "current" for the "valid to" column, which indicates on January 28$^{th}$ that the information in the fourth row is the current information for the corresponding Acme Corporation opportunity object. The database system also copies the date change of January 28$^{th}$ over "current" in the "valid to" column in the third row to indicate that the information in the third row is no longer current. Although the simplified example of the history object table 204 does not include times with the depicted dates, the database system stores change times with the "valid to" date in the third row and the "valid from" date in the fourth row so that no overlap in time exists for information corresponding to January 28$^{th}$.

The process of querying the history object table 202 is simple. For example, on January 30$^{th}$, the salesperson accesses the database system to determine what were the potential sales amount and the scheduled sales date for the Acme Corporation opportunity on January 25$^{th}$ when the salesperson had lunch with a friend of the sales lead. The database system may quickly access the "valid from" and "valid to" dates as a primary key or a pre-retrieved index to determine that the queried date will not be satisfied by the first two rows, but the database system does not have to retrieve, much less temporarily store the corresponding information in the first two rows. When the database system accesses the "valid from" and "valid to" dates corresponding to the third row, the database system quickly determines that the queried date will be satisfied by the third row, so the database system has to retrieve the corresponding information in only one row, the third row. The process for querying and retrieving data objects from the history object table 204 is much simpler and less prone to error than the prior art querying and retrieving process described above.

System Overview

Figure 3:
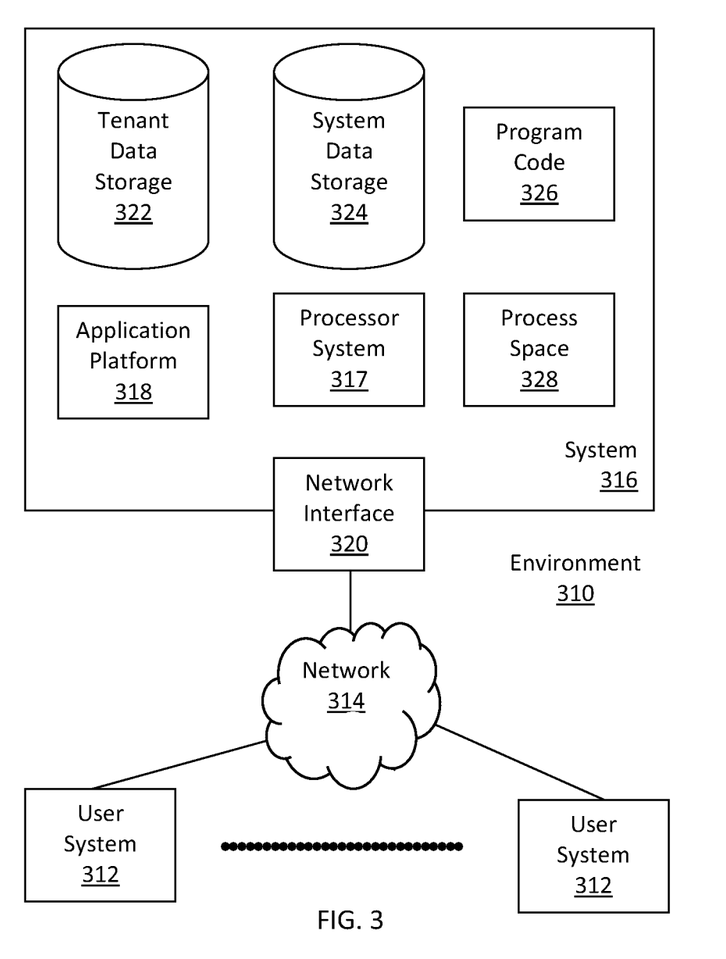
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein.

Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
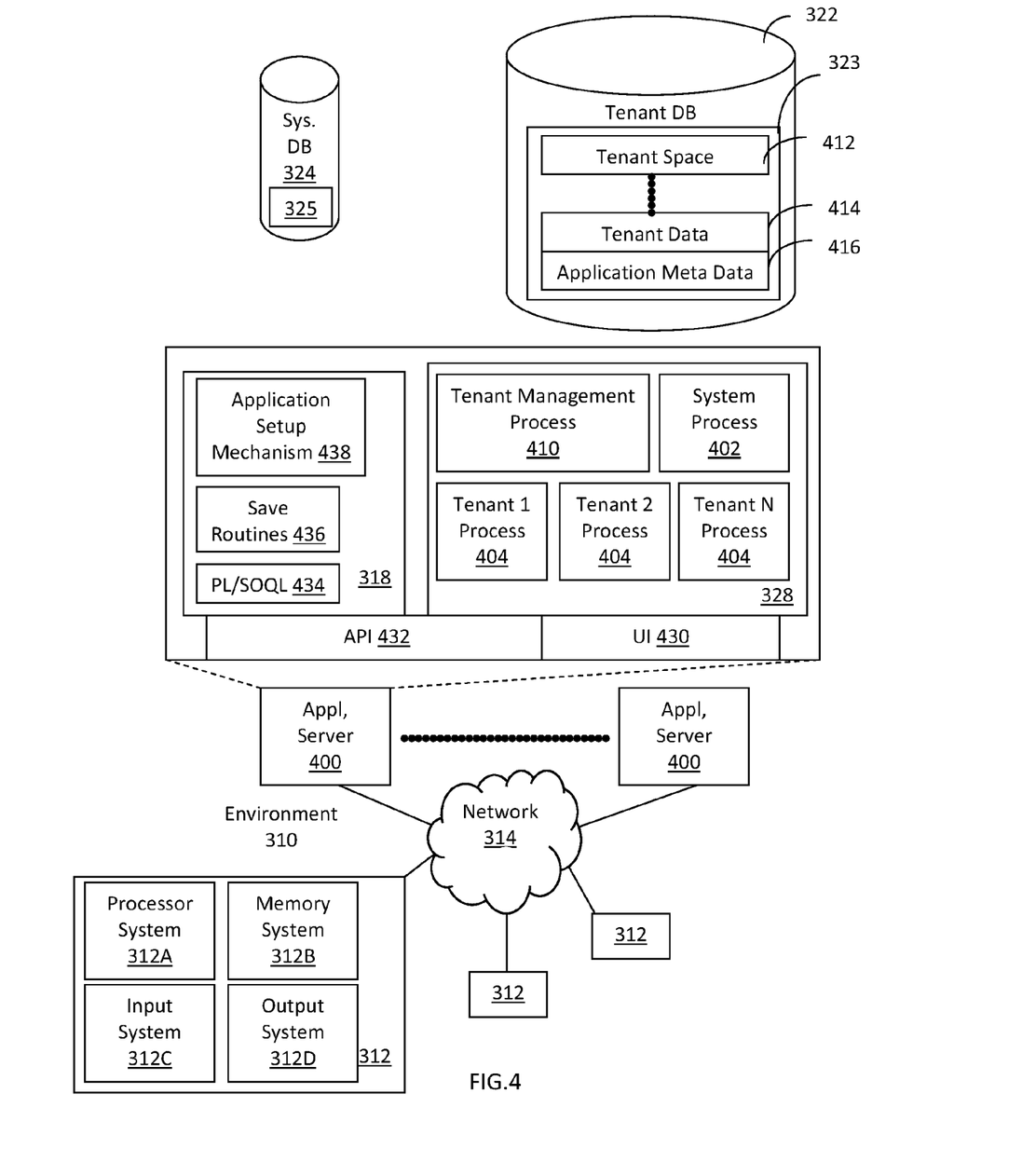
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for alternative change processes for changes to data objects, the apparatus comprising:
   a processor; and
   one or more stored sequences of instructions which, when executed by the processor, cause the processor to carry out the steps of:
   identifying, a change to a data object scheduled to be implemented by an alternative change process, the alternative change process being written in customized code that is less efficient than a standard change process, and the standard change process being used to implement user modifications to the data object;
   disabling the execution of the alternative change process;
   recording the identified change to the data object scheduled to be implemented by an alternative change process to a staging table;
   setting a trigger to request a standard change process to asynchronously process the scheduled change to the data object by the alternative change process; and
   executing one or more standard change processes to implement user modifications to the data object prior to executing the trigger, the execution of the trigger causing a reading of the staging table to perform additional modifications to the data object based on the identified change.

2. The apparatus of claim 1, wherein executing the trigger comprises:
   retrieving the data object and a second data object from the staging table, wherein the data object comprises an identifier, a field name, a first value, and a first date, and wherein the second data object comprises the identifier, the field name, a second value, and a second date; and
   storing a history object, wherein the history object comprises the identifier, the field name, the first value, the first date, and the second date, the processor further carrying out the step of outputting the history object in response to a query which specifies the identifier, the field name, and a query date within a range of the first date and the second date.

3. The apparatus of claim 2, wherein retrieving the data object and the second data object comprises retrieving a first plurality of data objects and a second plurality of data objects, and wherein storing the history object comprises storing a plurality of history objects.

4. The apparatus of claim 2, wherein the steps further comprise:
   retrieving a third data object and a fourth data object from the staging table, wherein the third data object comprises the identifier, another field name, a third value, and a third date, and wherein the fourth data object comprises the identifier, the other field name, a fourth value, and a fourth date;
   storing the history object, wherein the history object comprises the identifier, the other field name, the third value, the third date, and the fourth date;
   outputting the history object in response to a query which specifies the identifier, the other field name, and a query date within a range of the third date and the fourth date.

5. The apparatus of claim 4, wherein the history object further comprises a preceding value corresponding to the first value and another preceding value corresponding to the third value.

6. A computer program product, comprising a non-transitory computer-readable medium carrying one or more sequences of instructions for alternative change processes for changes to data objects, which instructions, when executed by one or more processors, cause the one or more processors to carry out the steps of:
   identify a change to a data object scheduled to be implemented by an alternative change process, the alternative change process being written in customized code that is less efficient than a standard change process, and the standard change process being used to implement user modifications to the data object;
   disable the execution of the alternative change process;
   record the identified change to the data object scheduled to be implemented by an alternative change process to a staging table;
   set a trigger to request a standard change process to asynchronously process the scheduled change to the data object by the alternative change process; and
   execute one or more standard change processes to implement user modifications to the data object prior to executing the trigger, the execution of the trigger causing a reading of the staging table to perform additional modifications to the data object based on the identified change.

7. The computer program product of claim 6, wherein executing the trigger comprises:
   retrieving the data object and a second data object from the staging table, wherein the data object comprises an identifier, a field name, a first value, and a first date, and wherein the second data object comprises the identifier, the field name, a second value, and a second date; and storing a history object, wherein the history object comprises the identifier, the field name, the first value, the first date, and the second date, wherein the steps further comprise outputting the history object in response to a query which specifies the identifier, the field name, and a query date within a range of the first date and the second date.

8. The computer program product of claim 7, wherein retrieving the data object and the second data object comprises retrieving a first plurality of data objects and a second plurality of data objects, and wherein storing the history object comprises storing a plurality of history objects.

9. The computer program product of claim 7, wherein the steps further comprise:

retrieving a third data object and a fourth data object from the staging table, wherein the third data object comprises the identifier, another field name, a third value, and a third date, and wherein the fourth data object comprises the identifier, the other field name, a fourth value, and a fourth date;

storing the history object, wherein the history object comprises the identifier, the other field name, the third value, the third date, and the fourth date;

outputting the history object in response to a query which specifies the identifier, the other field name, and a query date within a range of the third date and the fourth date.

10. The computer program product of claim 9, wherein the history object further comprises a preceding value corresponding to the first value and another preceding value corresponding to the third value.

11. A method for alternative change processes for changes to data objects, the method comprising:

identifying a change to a data object scheduled to be implemented by an alternative change process, the alternative change process being written in customized code that is less efficient than a standard change process, and the standard change process being used to implement user modifications to the data object;

disabling the execution of the alternative change process;

recording the identified change to the data object scheduled to be implemented by an alternative change process to a staging table;

setting a trigger to request a standard change process to asynchronously process the scheduled change to the data object by the alternative change process; and executing one or more standard change processes to implement user modifications to the data object prior to executing the trigger, the execution of the trigger causing a reading of the staging table to perform additional modifications to the data object based on the identified change.

12. The method of claim 11, wherein executing the trigger comprises:

retrieving the data object and a second data object from the staging table, wherein the data object comprises an identifier, a field name, a first value, and a first date, and wherein the second data object comprises the identifier, the field name, a second value, and a second date; and storing a history object, wherein the history object comprises the identifier, the field name, the first value, the first date, and the second date, the method further comprising outputting the history object in response to a query which specifies the identifier, the field name, and a query date within a range of the first date and the second date.

13. The method of claim 12, wherein retrieving the data object and the second data object comprises retrieving a first plurality of data objects and a second plurality of data objects, and wherein storing the history object comprises storing a plurality of history objects.

14. The method of claim 12, wherein the method further comprises:

retrieving a third data object and a fourth data object from the staging table, wherein the third data object comprises the identifier, another field name, a third value, and a third date, and wherein the fourth data object comprises the identifier, the other field name, a fourth value, and a fourth date;

storing the history object, wherein the history object comprises the identifier, the other field name, the third value, the third date, and the fourth date;

outputting the history object in response to a query which specifies the identifier, the other field name, and a query date within a range of the third date and the fourth date.

15. The method of claim 14, wherein the history object further comprises a preceding value corresponding to the first value and another preceding value corresponding to the third value.

16. A method for transmitting code for alternative change processes for changes to data objects on a transmission medium, the method comprising:

transmitting code to identify a change to a data object scheduled to be implemented by an alternative change process, the alternative change process being written in customized code that is less efficient than a standard change process, and the standard change process being used to implement user modifications to the data object;

transmitting code to disable the execution of the alternative change process;

transmitting code to record the identified change to the data object scheduled to be implemented by an alternative change process to a staging table;

transmitting code to set a trigger to request a standard change process to asynchronously process the scheduled change to the data object by the alternative change process; and transmitting code to execute one or more standard change processes to implement user modifications to the data object prior to executing the trigger, the execution of the trigger causing a reading of the staging table to perform additional modifications to the data object based on the identified change.

17. The method for transmitting code of claim 16, wherein executing the trigger comprises:

retrieving the data object and a second data object from the staging table, wherein the data object comprises an identifier, a field name, a first value, and a first date, and wherein the second data object comprises the identifier, the field name, a second value, and a second date; and storing a history object, wherein the history object comprises the identifier, the field name, the first value, the first date, and the second date, the method further comprising outputting the history object in response to a query which specifies the identifier, the field name, and a query date within a range of the first date and the second date.

18. The method for transmitting code of claim 17, wherein retrieving the data object and the second data object comprises retrieving a first plurality of data objects and a second plurality of data objects, and wherein storing the history object comprises storing a plurality of history objects.

19. The method for transmitting code of claim 17, wherein the method further comprises:
- transmitting code to retrieve a third data object and a fourth data object from the staging table, wherein the third data object comprises the identifier, another field name, a third value, and a third date, and wherein the fourth data object comprises the identifier, the other field name, a fourth value, and a fourth date;
- transmitting code to store the history object, wherein the history object comprises the identifier, the other field name, the third value, the third date, and the fourth date;
- transmitting code to output the history object in response to a query which specifies the identifier, the other field name, and a query date within a range of the third date and the fourth date.

20. The method for transmitting code of claim 19, wherein the history object further comprises a preceding value corresponding to the first value and another preceding value corresponding to the third value.

* * * * *